(12) United States Patent
Hatzilias et al.

(10) Patent No.: US 12,013,531 B1
(45) Date of Patent: Jun. 18, 2024

(54) ACTIVE DISPARITY SENSING OF HEAD MOUNTED DISPLAY

(71) Applicant: Meta Platforms Technologies, LLC, Menlo Park, CA (US)

(72) Inventors: Karol Constantine Hatzilias, Sammamish, WA (US); Tamer Elazhary, Redmond, WA (US); Yu Shi, Redmond, WA (US); Guohua Wei, Redmond, WA (US); Michiel Koen Callens, Mountain View, CA (US); Nicholas Mcgee, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/075,838

(22) Filed: Dec. 6, 2022

(51) Int. Cl.
*G02B 27/01* (2006.01)

(52) U.S. Cl.
CPC .... *G02B 27/0101* (2013.01); *G02B 2027/014* (2013.01); *G02B 2027/0147* (2013.01)

(58) Field of Classification Search
CPC .......... G02B 27/0101; G02B 2027/014; G02B 2027/0147
See application file for complete search history.

(56) References Cited

U.S. PATENT DOCUMENTS

| 9,097,890 | B2 | 8/2015 | Miller et al. |
| 10,345,601 | B2 | 7/2019 | Levola et al. |
| 10,656,353 | B2 | 5/2020 | Pierer et al. |
| 2013/0063486 | A1* | 3/2013 | Braun ............ G09G 3/002 345/633 |
| 2018/0122143 | A1* | 5/2018 | Ellwood, Jr. ...... G02B 27/0172 |
| 2018/0267318 | A1* | 9/2018 | Levola .............. G02B 27/0018 |
| 2019/0196200 | A1* | 6/2019 | Pierer ..................... G02B 6/42 |
| 2022/0006987 | A1 | 1/2022 | Seiler et al. |

FOREIGN PATENT DOCUMENTS

WO      2020243828 A1    12/2020

* cited by examiner

*Primary Examiner* — Brent D Castiaux
(74) *Attorney, Agent, or Firm* — Freestone Intellectual Property Law PLLC; Aaron J. Visbeek

(57) ABSTRACT

A near-eye optical assembly includes a display waveguide and an optical structure. The display waveguide is configured to receive display light and to direct the display light to an eye of a user. The optical structure includes an input coupler, an optical path, and an output coupler. The input coupler is disposed to receive a portion of the display light that propagates through the waveguide. The optical path directs the portion of the display light from the input coupler to an output coupler that is configured to provide the received portion of the display light to a disparity sense circuit.

20 Claims, 10 Drawing Sheets

ACTIVE DISPARITY SENSING OF HEAD MOUNTED DISPLAY

FIELD OF DISCLOSURE

Aspects of the present disclosure relate generally to head mounted displays (HMDs), and in particular but not exclusively, relate to HMDs that include disparity sensing.

BACKGROUND

A head mounted display (HMD) is a display device, typically worn on the head of a user. HMDs may be used in a variety of applications, such as gaming, aviation, engineering, medicine, entertainment and so on to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. Some HMDs may be configured to allow binocular viewing by the user. For example, 3D or stereoscopic images may be viewed by the user by displaying artificial reality content via both a left and a right eye piece of the HMD.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a near-eye optical assembly and a head mounted display (HMD) with active disparity sensing are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element," "near-eye optical assembly," or a "near-eye system" would include one or more elements configured to be placed within 50 mm of the eye of the user.

As discussed above, some HMDs may be configured to allow binocular viewing by presenting content to both the left and right eyes of a user, via a respective left-eye optical assembly and a right-eye optical assembly. However, during use, the HMD may be subjected to various thermal or mechanical stresses that cause deformation and/or misalignment of one or more components of the HMD (e.g., frame, lenses, optical components, etc.). Such deformation may result in disparity in the content that is displayed between both eyes. In some contexts, disparity refers to spatial (or binocular) disparity where content is presented to the user at a location different from what is intended by the HMD. In other contexts, disparity may refer to a change in intensity, noise, and/or distortion of the content. This disparity may negatively affect the viewing of images rendered by the HMD, especially with 3D or stereoscopic images, which may inhibit fusing of left and right images by the user and may lead to a reduction in the immersion or presence experienced.

Figure 1:
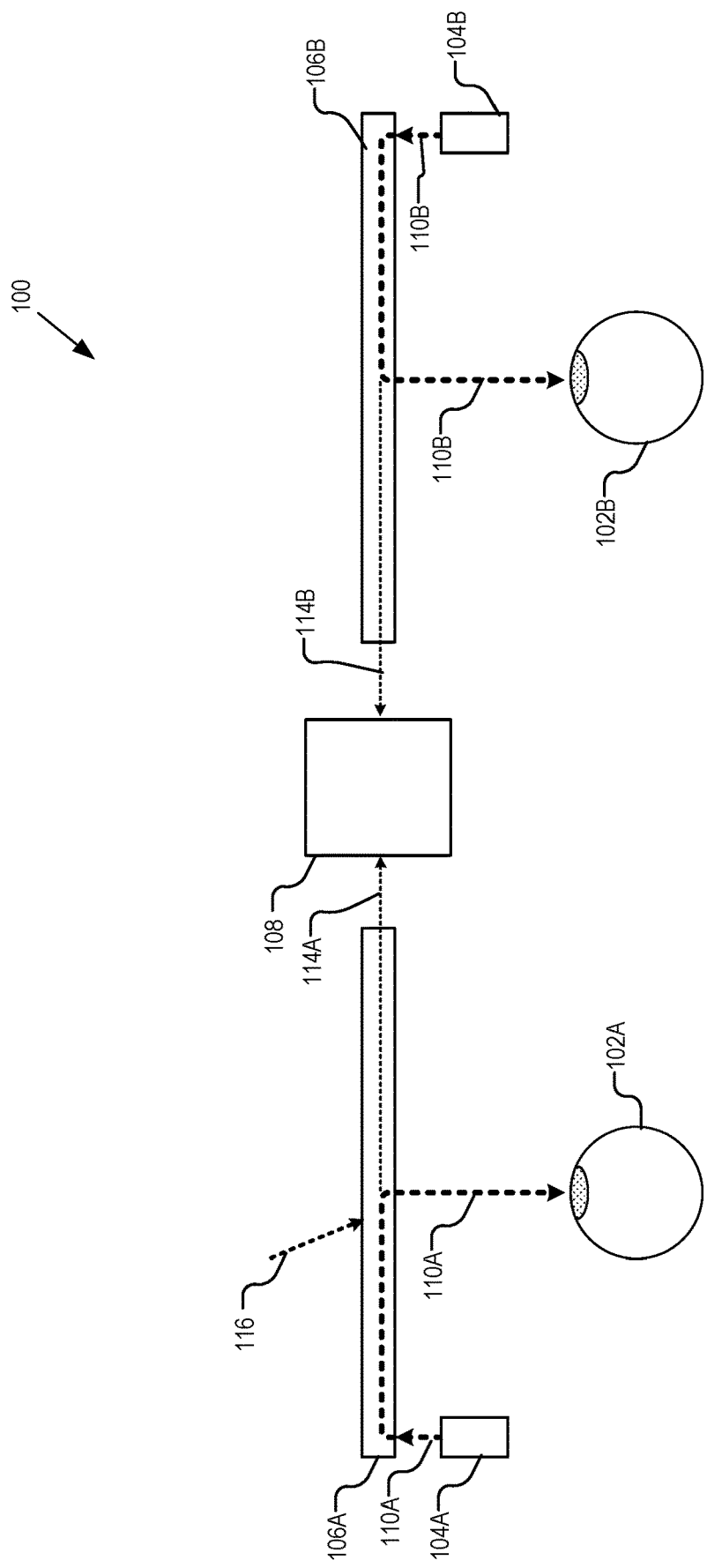
FIG. 1 illustrates an example head mounted display (HMD).

Some HMDs may be configured to detect the aforementioned disparity. For example, FIG. 1 illustrates an example head mounted display (HMD) 100 that includes a disparity detector 108. HMD 100 is also shown as including a first digital projector 104A, a second digital projector 104B, a first waveguide 106A, and a second waveguide 106B. As shown in FIG. 1, digital projector 104A is configured to generate display light 110A which is directed to a left-eye 102A by way of the first waveguide 106A. Similarly, digital projector 104B is configured to generate display light 110B which is directed to a right-eye 102B by way of the second waveguide 106B. The disparity detector 108 may include optics, a camera, and processing circuitry configured to detect binocular disparity of the HMD 100 based on the remaining portions 114A and 114B of the display light 110A and display light 110B, respectively. That is, the remaining portion 114A includes remaining display light that is directed through the waveguide 106A after much of the display light 110A has been extracted towards the eye 102A. Similarly, remaining portion 114B includes remaining display light 110B after display light 110B has been extracted towards the eye 102B. However, waveguides 106A and 106B may be lossy by design to increase light efficiency into the eye. Thus, the photons included in the remaining portions 114A and 114B of display light may be significantly less than those emitted directly from their respective digital projectors 104A and 104B. This low optical efficiency may inhibit or prevent the disparity detector 108 from accurately sensing any disparity.

Furthermore, the content presented to the user by way of the display light 110A/110B may be sparse and inconsistent. That is, virtual graphics displayed to the user may be small and only appear periodically. Thus, detection of any disparity utilizing the remaining portions 114A and 114B of the display light may be further impeded by these factors. Even still, waveguides 106A and 106B may be susceptible to ambient light, such as ambient light 116. That is, ambient light 116 may in couple into the waveguide 106A, further reducing contrast for disparity sensing by the disparity detector 108.

Accordingly, aspects of the present disclosure include a near-eye optical assembly and an HMD that includes one or more dedicated optical structures, such as a photonic integrated circuits (PICs), for the sensing of binocular disparity. As will be described below, the optical structures may be coupled to the display waveguide to provide an optical path for a portion of the display light that is separate and distinct from the optical path that is utilized for displaying content to the user. Thus, the efficiency of light that is received by the disparity detection circuitry may be greatly increased as compared to the example HMD 100 of FIG. 1. These and other aspects will be described in more detail below.

Figure 2:
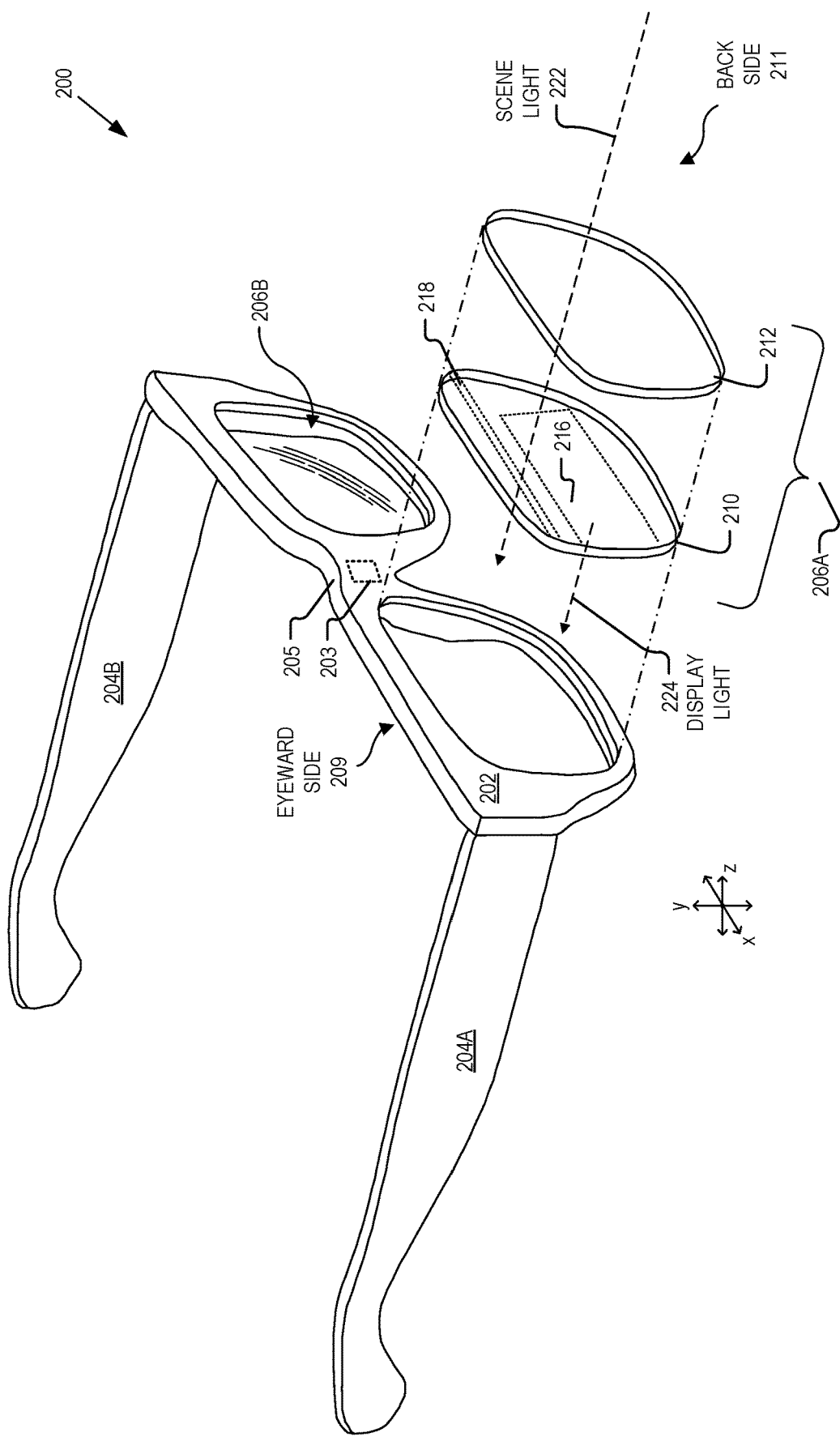
FIG. 2 illustrates an example HMD, in accordance with aspects of the disclosure.

FIG. 2 illustrates an example HMD 200, in accordance with aspects of the disclosure. The illustrated example of HMD 200 is shown as including a frame 202, temple arms 204A and 204B, a near-eye optical assembly 206A, and a near-eye optical assembly 206B. Frame 202 is shown as including a disparity sense circuit 203 disposed in a bridge area 205 of the frame 202. FIG. 2 also illustrates an exploded view of the near-eye optical assembly 206A. Near-eye optical assembly 206A is shown as including a display layer 210 and an optional optical element 212.

As shown in FIG. 2, frame 202 is coupled to temple arms 204A and 204B for securing the HMD 200 to the head of a user. Example HMD 200 may also include supporting hardware incorporated into the frame 202 and/or temple arms 204A and 204B. The hardware of HMD 200 may include any of processing logic, wired and/or wireless data interfaces for sending and receiving data, graphic processors, and one or more memories for storing data and computer-executable instructions. In one example, HMD 200 may be configured to receive wired power and/or may be configured to be powered by one or more batteries. In addition, HMD 200 may be configured to receive wired and/or wireless data including video data.

FIG. 2 illustrates near-eye optical assemblies 206A and 206B that are configured to be mounted to the frame 202. The frame 202 may house the near-eye optical assemblies 206A and 206B by surrounding at least a portion of a periphery of the near-eye optical assemblies 206A and 206B. The near-eye optical assembly 206A is configured to receive visible scene light 222 at a backside 211 of the near-eye optical assembly 206A and to direct the visible scene light 222 towards the eyeward side 209. In some examples, near-eye optical assembly 206A may appear transparent to the user to facilitate augmented reality or mixed reality such that the user can view visible scene light 222 from the environment while also receiving display light 224 directed to their eye(s) by way of display layer 210. In further examples, some or all of the near-eye optical assemblies 206A and 206B may be incorporated into a virtual reality headset where the transparent nature of the near-eye optical assemblies 206A and 206B allows the user to view an electronic display (e.g., a liquid crystal display (LCD), an organic light emitting diode (OLED) display, a micro-LED display, etc.) incorporated in the virtual reality headset.

As shown in FIG. 2, the display layer 210 is disposed between the eyeward side 209 and the backside 211 of the near-eye optical assembly 206A. In some examples, display layer 210 may include a display waveguide 216 that is configured to direct display light 224 to present one or more virtual graphics to an eye of a user of HMD 200. In some aspects, display waveguide 216 is configured to direct display light 224 that is generated by an electronic display, or projector, to the eye of the user. In some implementations, at least a portion of the electronic display is included in the frame 202 of the head-mounted device 200. The electronic display may include an LCD, an organic light emitting diode (OLED) display, micro-LED display, pico-projector, or liquid crystal on silicon (LCOS) display for generating the display light 224.

FIG. 2 also illustrates display layer 210 as including an optical structure 218. In some aspects, optical structure 218 includes one or more photonic integrated circuits (PICs). In some examples, optical structure 218 provides an optical path (e.g., waveguide) that is separate and distinct from the optical path provided by the display waveguide 216. For example, optical structure 218 may be coupled to receive a portion of the display light 224 that propagates through the display waveguide 216 and to direct this portion of display light along a surface of the display waveguide 216 to the disparity sense circuit 203. In some examples, optical structure 218 directs the portion of the display light along the surface of the display waveguide 216 from a region proximate to the temple arm 204A to a region proximate to the bridge area 205 (e.g., towards the location of the disparity sense circuit 203).

In some examples, the near-eye optical assembly 206B has a similar structure including a display waveguide and a separate optical structure for directing a portion of its display light to disparity sense circuit 203. The disparity sense circuit 203 may then detect the presence and amount of binocular disparity based on respective portions of display light received from both near-eye optical assemblies 206A and 206B.

FIG. 2 also shows the near-eye optical assembly 206A as including an optional optical element 212. Optical element 212 may include one or more elements such as a filter, a lens, a mirror, a prism, an attenuator, a diffractive element, a waveguide, a polarizer, or the like. In some examples, the display layer 210 and/or the optional optical element 212 may have a curvature for focusing light (e.g., scene light 222) to the eye of the user. Thus, the display layer 210 and/or the optional optical element 212 may, in some examples, may be referred to as lenses. In some aspects, the display layer 210 and/or the optional optical element 212 have a thickness and/or curvature that corresponds to the specifications of a user. In other words, the display layer 210 and/or optional optical element 212 may be a prescription lens.

Figure 3A:
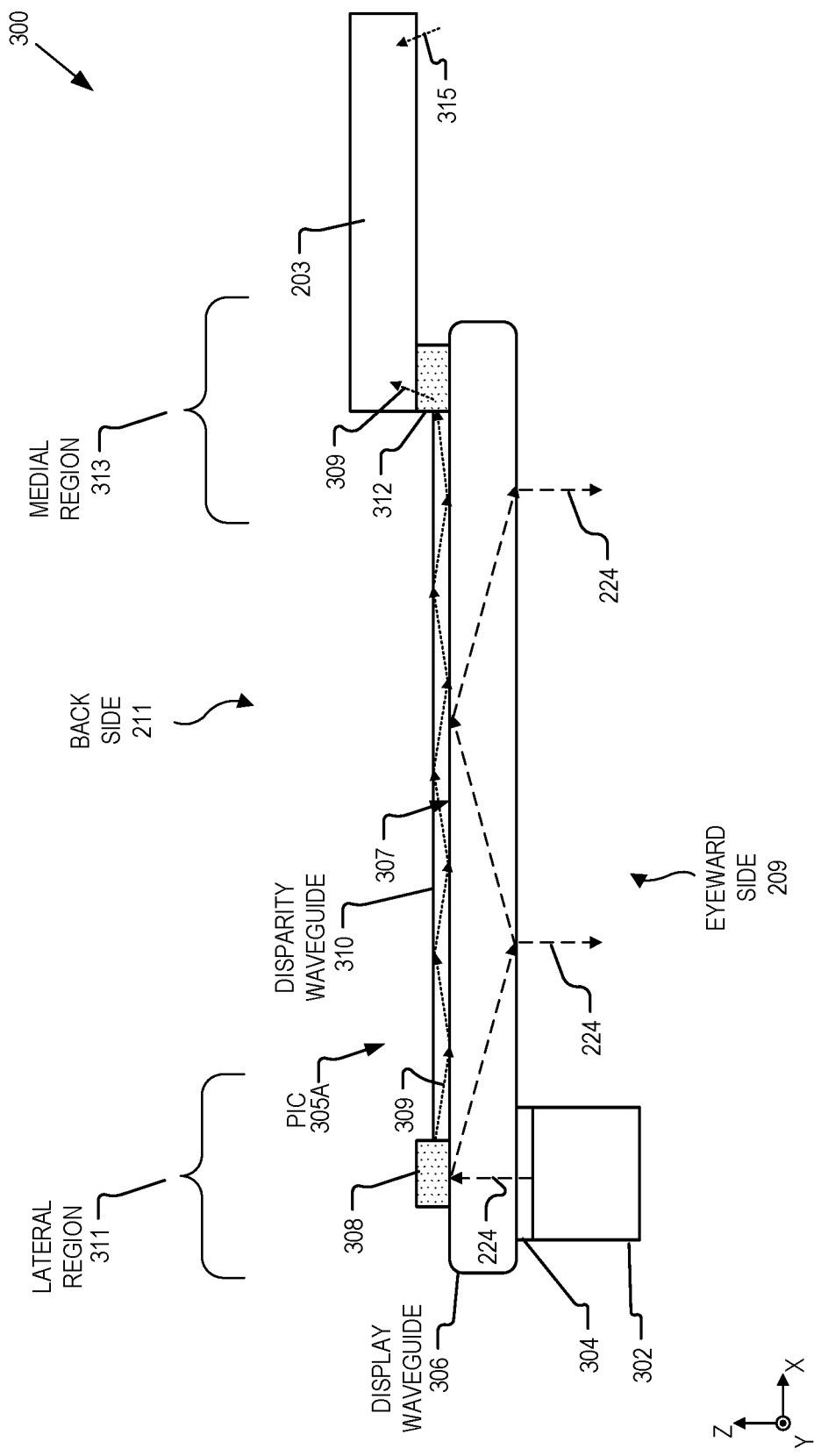
FIG. 3A illustrates an example near-eye optical assembly, in accordance with aspects of the disclosure.

FIG. 3A illustrates an example near-eye optical assembly 300, in accordance with aspects of the disclosure. The illustrated example of near-eye optical assembly 300 is shown as including a projector 302, a first input coupler 304, a PIC 305A, and a display waveguide 310. PIC 305A is shown as including a second input coupler 308, a disparity waveguide 310, and an output coupler 312. Also shown in FIG. 3A is the disparity sense circuit 203. PIC 305A is one possible example of optical structure 218 of FIG. 2. Near-eye optical assembly 300 is one possible implementation of near-eye optical assembly 206A and/or near-eye optical assembly 206B of FIG. 2.

As shown in FIG. 3A, projector 302 is configured to generate display light 224. In some examples, display light 224 is visible light including color components, such as red, green, and blue. The first input coupler 304 is disposed between the projector 302 and the display waveguide 306 to in couple the display light 224 to the display waveguide 306. In some examples, the first input coupler 304 includes one or more input gratings. As shown, the display waveguide 306 receives the display light 224 and directs the display light 224 to an eye of a user. For instance, display light 224 may propagate through the display waveguide 306 by way of total internal reflection (TIR), where the display waveguide 306 includes one or more extraction features for extracting the display light 224 out of the display waveguide 306 towards the eyeward side 209.

The second input coupler 308 is shown as disposed on a surface 307 of the display waveguide 306. In some aspects, the second input coupler 308 is disposed on a side of the display waveguide that is opposite the first input coupler 304. For example, FIG. 3A illustrates the second input coupler 308 as being disposed on the surface 307 on the backside 211 of the display waveguide 306, whereas the first input coupler 304 is disposed on the eyeward side 209 of the display waveguide 306. Thus, the second input coupler 308 is disposed to receive at least a portion of the display light 224 that propagates through display waveguide 306 (e.g., propagates from the eyeward side 209 to the backside 211 of the display waveguide 306).

Figure 3B:
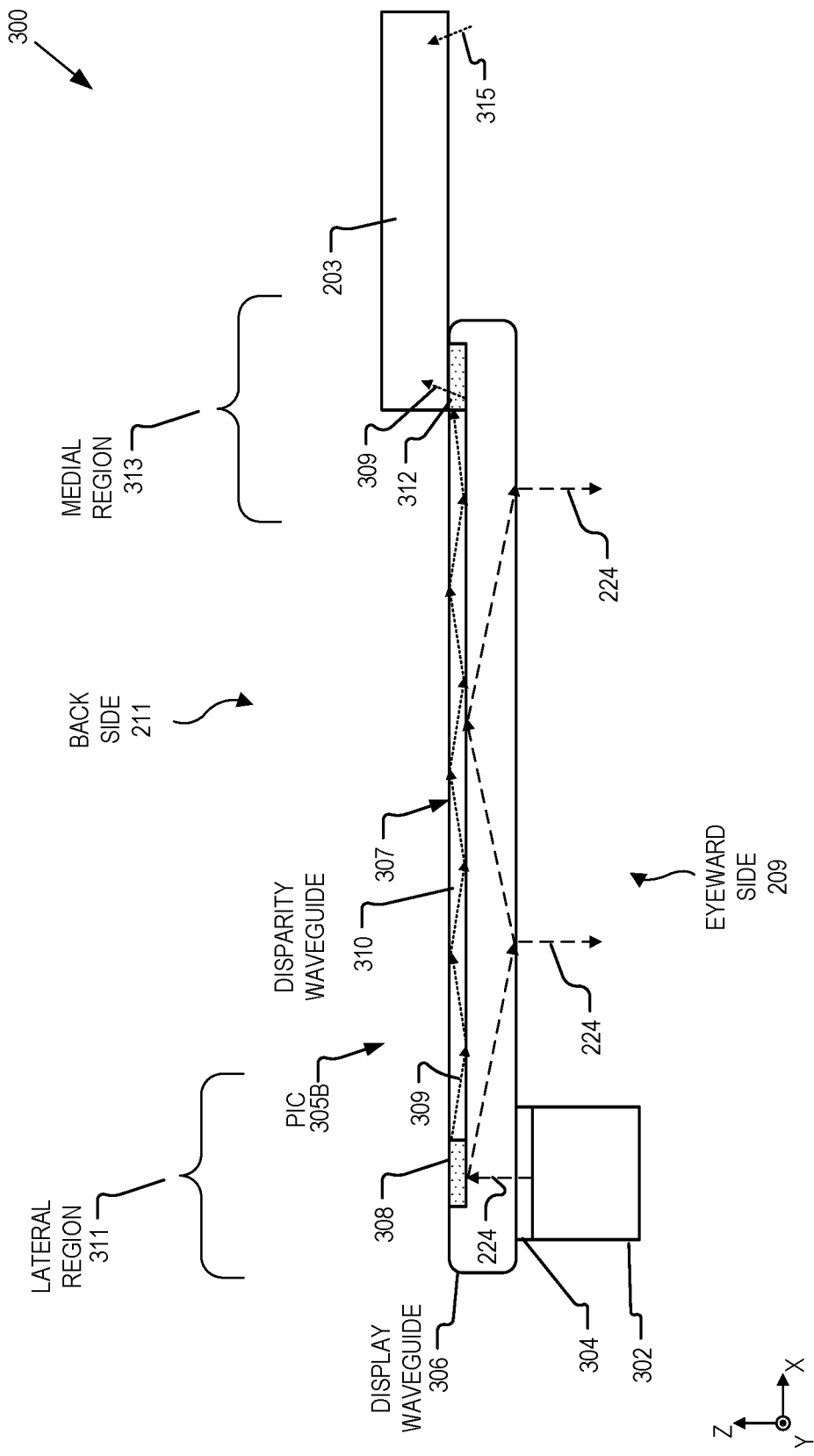
FIG. 3B illustrates another example near-eye optical assembly that includes a disparity waveguide embedded within a display waveguide, in accordance with aspects of the disclosure.

In some examples, second input coupler 308 includes an input grating for in coupling at least a portion 309 of the display light 224 into an optical path provided by PIC 305A. In some aspects, the input grating is an angular-sensitive input grating. In the example of FIG. 3A, the optical path of PIC 305A is provided by the disparity waveguide 310. Disparity waveguide 310 is configured to direct the portion 309 of the display light 224 along the surface 307 of the display waveguide 306. In some examples, the first input coupler 304 and the second input coupler 308 are disposed in a lateral region 311 of the near-eye optical assembly 300 (e.g., proximate to a temple arm of frame 202). The optical path of the PIC 305A is configured to direct the portion 309 of the display light 224 from the lateral region 311 to a medial region 313 (e.g., proximate to the bridge area 205 of frame 202). In some examples, the disparity waveguide 310 is disposed on the surface 307 of the display waveguide 306 and is configured to direct the portion 309 of the display light 224 to the output coupler 312 by way of TIR. In other examples, the disparity waveguide 310 is disposed beneath the surface 307 of the display waveguide 306. For instance, FIG. 3B illustrates a PIC 305B that includes disparity waveguide 310 embedded within the display waveguide 306 beneath the surface 307.

Returning now to FIG. 3A, the output coupler 312 is configured to receive the portion 309 of display light from the optical path (e.g., the disparity waveguide 310) and to provide the portion 309 to the disparity sense circuit 203. The output coupler 312 may include one or more output gratings for outcoupling the portion 309 from the disparity waveguide 310 to disparity sense circuit 203. The disparity sense circuit 203 may include optics, a camera, and processing circuitry that are configured to detect binocular disparity between the near-eye optical assembly 300 and another near-eye optical assembly (not explicitly shown in FIG. 3A). The disparity sense circuit 203 may detect the binocular disparity based on the remaining portion 309 received from near-eye optical assembly 300 and based on a remaining portion 315 of display light received from another near-eye optical assembly. In some aspects, the disparity sense circuit 203 is configured to detect a tip tilt between projector 302 and the display waveguide 306. In another aspect, the disparity sense circuit 203 may detect a tip tilt of the projector 302 and/or the display waveguide from left-eye to right-eye optical assemblies. In yet another aspect, the disparity sense circuit 203 may detect deformation of the display waveguide 306. Even still, the disparity sense circuit 203 may be configured to detect intrinsic deformation of the projector 302, itself.

Although FIG. 3A illustrates near-eye optical assembly 300 as including a single PIC 305A, the near-eye optical assembly 300 may include any number of PICs including one or more. For example, PIC 305A may be one of a plurality of PICs included in the near-eye optical assembly 300, each configured to provide a respective portion of the display light 224 to the disparity sense circuit 203. In some aspects, the second input coupler 308 may include at least one image forming optic to simultaneously illuminate several PICs with the portion 309 of display light. By way of example, FIG. 3C illustrates the illumination of a plurality of PICs 320A-320I with an image forming optic 318, in accordance with aspects of the disclosure.

Figure 3D:
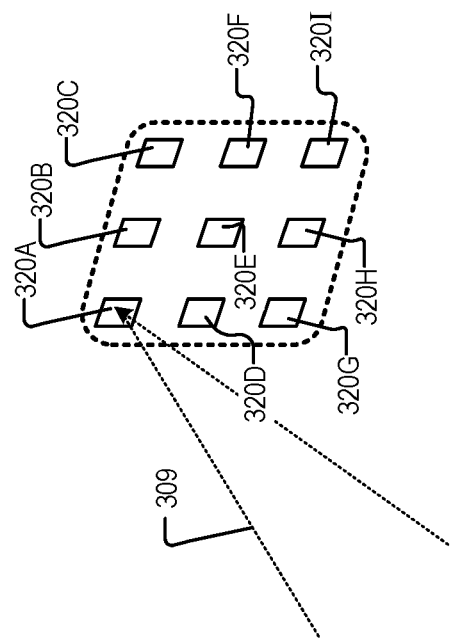
FIG. 3D illustrates the illumination of a single PIC of a plurality of PICs, in accordance with aspects of the disclosure.
Figure 3C:
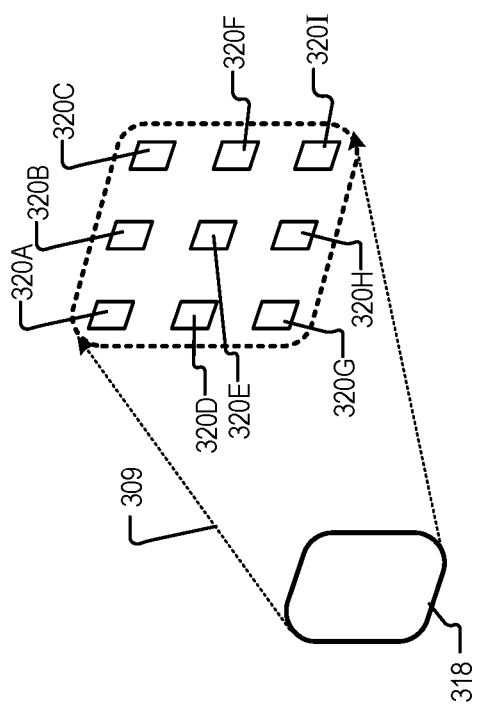
FIG. 3C illustrates the illumination of a plurality of Photonic Integrated Circuits (PICs), in accordance with aspects of the disclosure.

FIG. 3D illustrates the plurality of PICs 320A-320I of a near-eye optical assembly but arranged such that only a single PIC of a plurality of PICs is illuminated at a time, in accordance with aspects of the disclosure. For example, one or more pixels of the projector may be utilized to illuminate the PIC s, where the individual PIC that is illuminated corresponds to the tip or tilt of the projector with respect to the display waveguide. That is, tip tilt and/or disparity of one or more components of the near-eye optical assembly may shift the position of the portion 309 of the display light on the PICs 320A-320I.

In some examples, a near-eye optical assembly in accordance with aspects of the present disclosure may include a plurality of PICs per color channel. In this example, the disparity sense circuit 203 may be configured to disambiguate fluctuations in display intensity based on the respective portions of the display received from the plurality of PICs.

In another example, the near-eye optical assembly includes a plurality of PICs arranged both horizontally and vertically, where the disparity sense circuit 203 is configured to disambiguate tip and/or tilt rotations.

In yet another example, the near-eye optical assembly may include PICs that include combinations of angular-sensitive and non-angular sensitive input and output gratings combined on the projector side (i.e., eye-ward side 209) and the PIC side (i.e., backside 211), where the disparity sense circuit 203 is configured to disambiguate display waveguide disparity from projector disparity.

Figure 4:
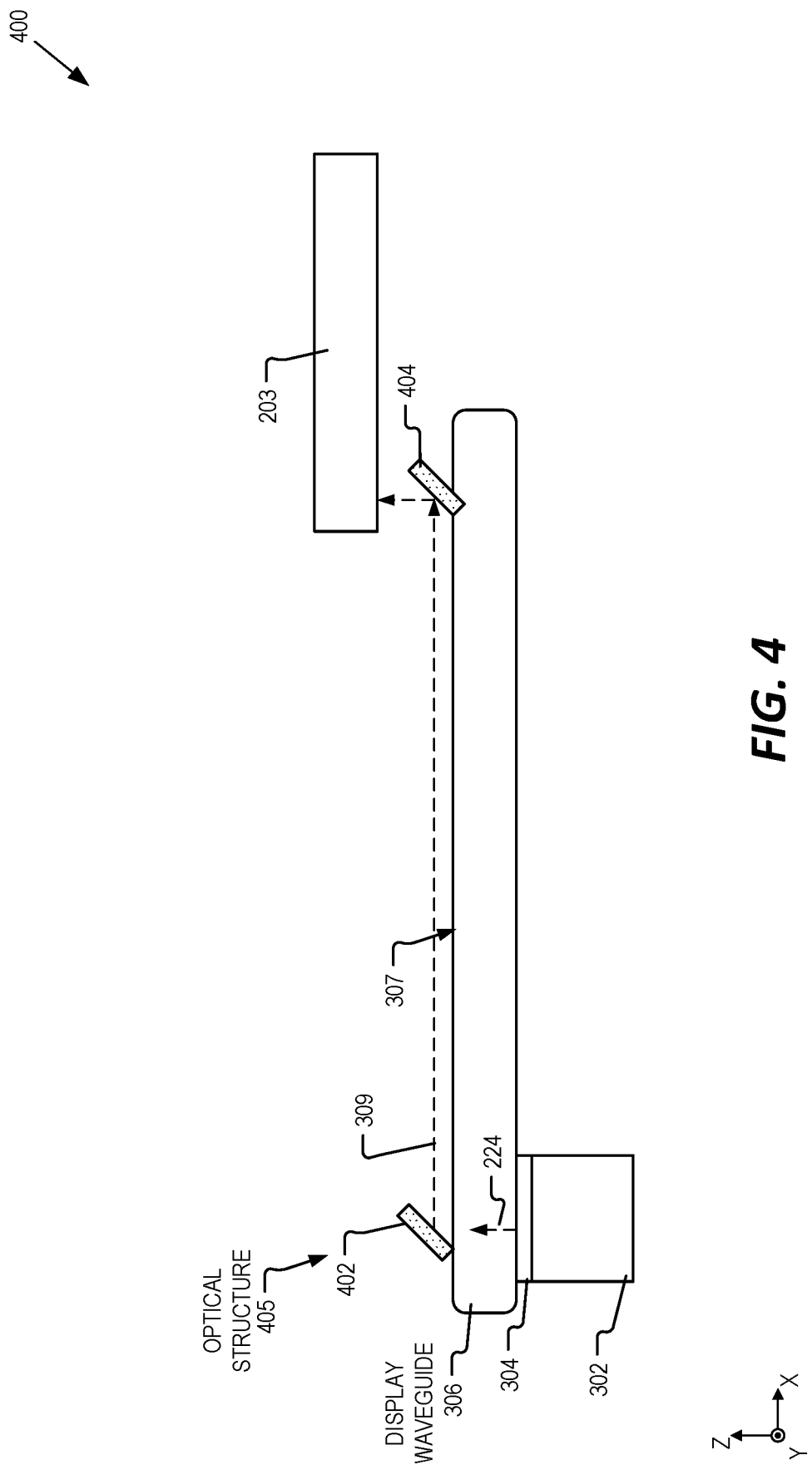
FIG. 4 illustrates another example near-eye optical assembly, in accordance with aspects of the disclosure.

FIG. 4 illustrates another example near-eye optical assembly 400, in accordance with aspects of the disclosure. The illustrated example of near-eye optical assembly 400 is shown as including projector 302, an optical structure 405, and display waveguide 306. Optical structure 405 is shown as including a second input coupler 402 and an output coupler 404. Optical structure 405 is one possible example of optical structure 218 of FIG. 2. Near-eye optical assembly 400 is one possible implementation of near-eye optical assembly 206A and/or near-eye optical assembly 206B of FIG. 2.

The second input coupler 402 is shown as disposed on the surface 307 of the display waveguide 306. In some examples, second input coupler 402 includes a reflector for directing at least a portion 309 of the display light 224 into an optical path provided by optical structure 405. In the example of FIG. 4, second input coupler 402 is configured to direct the portion 309 on an optical path along the surface 307 of the display waveguide 306 to the output coupler 404, which may also include a reflector. The output coupler 404 is configured to receive the portion 309 of display light from the optical path and to provide the portion 309 to the disparity sense circuit 203.

Figure 5:
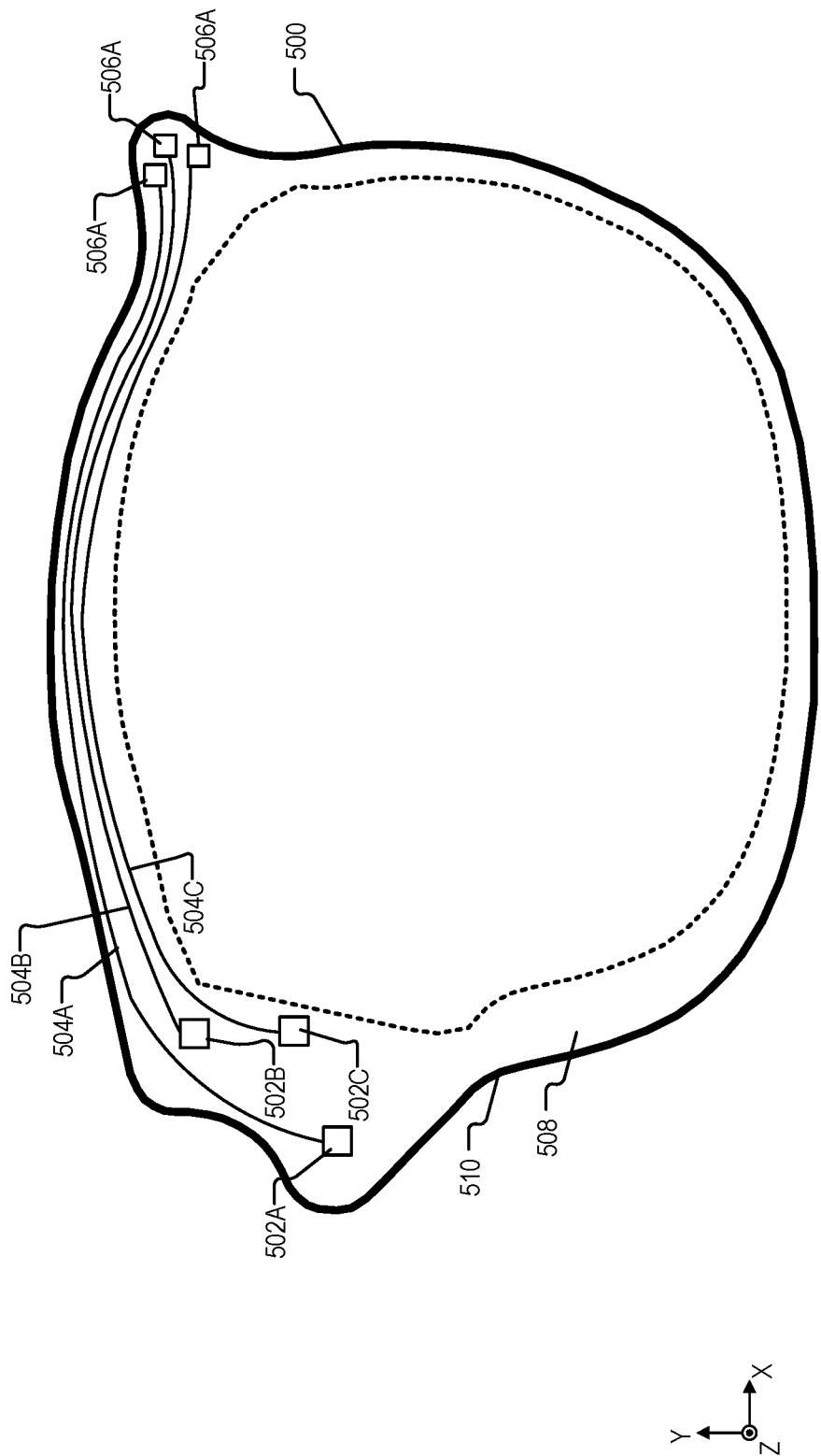
FIG. 5 is a front view illustrating an example near-eye optical assembly, in accordance with aspects of the disclosure.

FIG. 5 is a front view illustrating an example near-eye optical assembly 500, in accordance with aspects of the disclosure. The illustrated example of near-eye optical assembly 500 is shown as including input couplers 502A, 502B, and 502C, disparity waveguides 504A, 504B, and 504C, and output couplers 506A, 506B, and 506C. Near-eye optical assembly 500 is one possible implementation of near-eye optical assembly 206A and/or near-eye optical assembly 206B of FIG. 2. Disparity waveguides 504A may include one or more waveguides for directing a portion of display light from a corresponding one or more input couplers 502A to a respective one or more output couplers 506A. Similarly, disparity waveguides 504B may include one or more waveguides for directing a portion of display light from a corresponding one or more input couplers 502B to a respective one or more output couplers 506B. Disparity waveguides 504C may include one or more waveguides for directing a portion of display light from a corresponding one or more input couplers 502C to a respective one or more output couplers 506C.

In some examples, the disparity waveguides 504A, 504B, and 504C are disposed in a periphery region 508 of the near-eye optical assembly 500, proximate to the edge 510. As mentioned above, the near-eye optical assembly 500 may be configured to be housed within a frame, such as frame 202 of FIG. 2. Thus, in some examples, the frame may be configured to shield the periphery region 508 from ambient light to prevent or reduce the interference with the disparity waveguides.

Figure 6C:
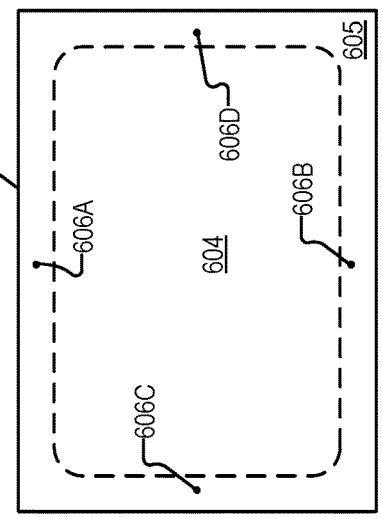
FIGS. 6A, 6B, and 6C illustrate a projector for use with a near-eye optical assembly, in accordance with aspects of the disclosure.
Figure 6B:
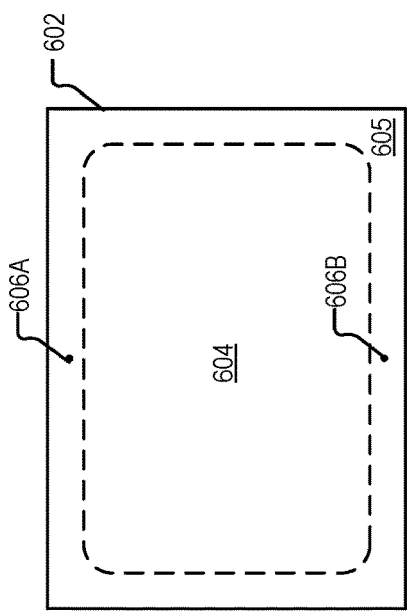
Figure 6A:
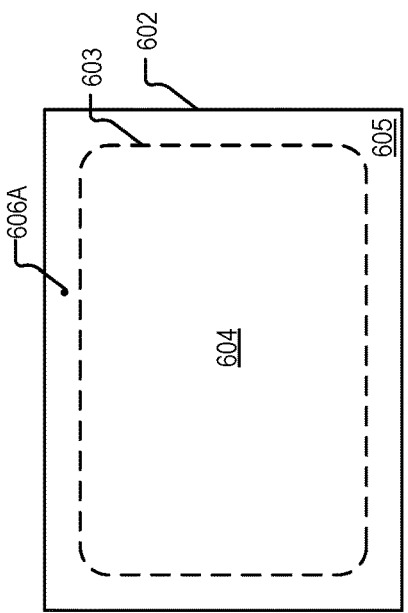

FIGS. 6A, 6B, and 6C illustrate a projector 602 for use with a near-eye optical assembly, in accordance with aspects of the disclosure. Projector 602 is one possible implementation of projector 302 of FIG. 3A. In some aspects, projector 602 includes a plurality of pixels configured to generate display light for presentation to a user. As shown in FIG. 6A, the projector 602 may include a first region 604 and a second region 605. First region 604 corresponds to pixels that are within a field-of-view 603 of the HMD, whereas second region 605 corresponds to pixels that are outside the field-of view 603. In some implementations, aspects of the present disclosure may be configured to utilize one or more pixels that are located in the second region 605 (i.e., outside the field-of-view) for disparity sensing. In some examples, the one or more pixels located in second region 605 may be configured to be always on (i.e., always emitting display light) since they are located outside the field-of-view. Providing always-on pixels may allow instantaneous detection of disparity. Even still, these pixels may be on at a level that is imperceptible to the user because of the increased efficiency provided by using dedicated optical paths of the PICs.

By way of example, FIG. 6A includes the use of a single pixel 606A in the second region 605 for disparity detection. Display light generated by the single pixel 606A may be in coupled to any of the aforementioned optical structures (e.g., PIC) for the detection and processing by the disparity sense circuit 203. FIG. 6B illustrates the use of two pixels 606A and 606B, both located in the second region 605, for disparity detection. In some examples, pixels 606A and 606B are co-linear (i.e., on the same y-axis). FIG. 6C illustrates the use of four pixels, 606A, 606B, 606C, and 606D, all located in the second region 605, for disparity detection. As mentioned above, pixels 606A and 606B may be colinear on the same y-axis. Similarly, pixels 606C and 606D may be colinear but on an orthogonal x-axis.

Figure 7A:
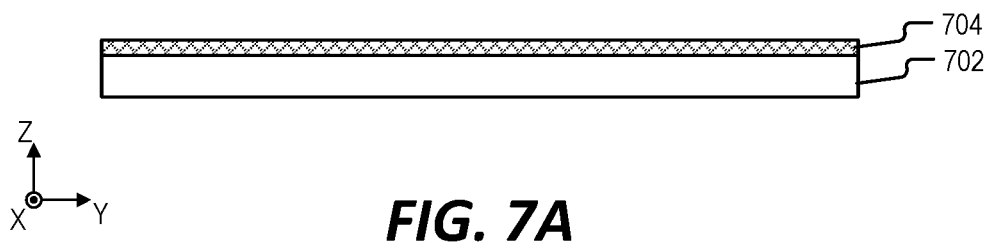
FIGS. 7A-7D illustrates a process of forming a near-eye optical assembly, in accordance with aspects of the disclosure.
Figure 7B:
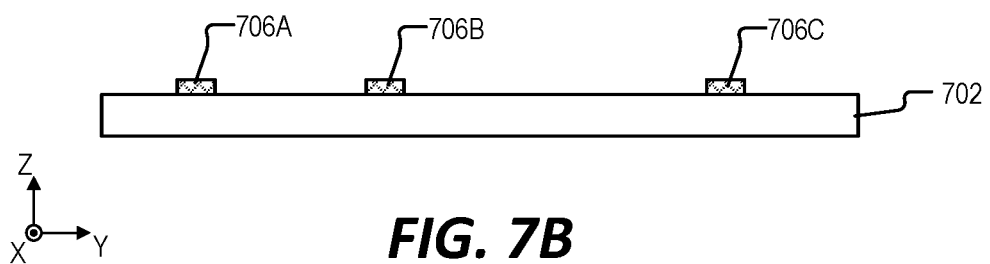
Figure 7C:
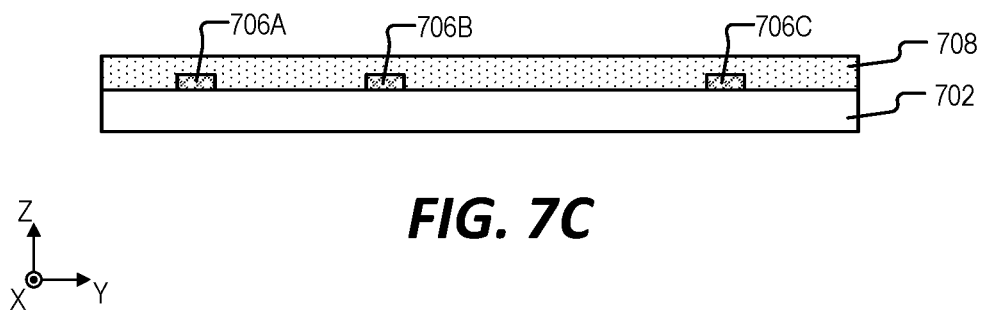
Figure 7D:
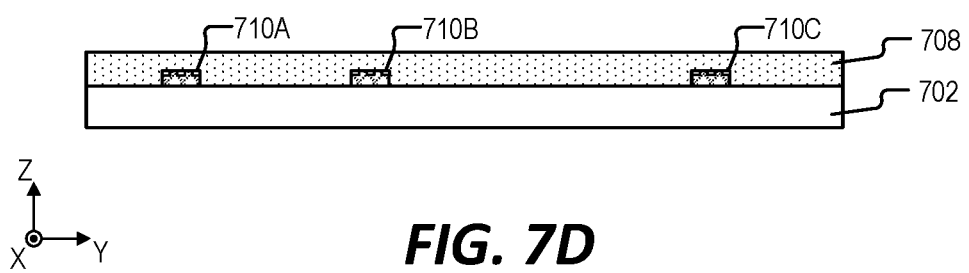

FIGS. 7A-7D illustrates a process of forming a near-eye optical assembly, in accordance with aspects of the disclosure. In FIG. 7A a SiN layer 704 is deposited onto a substrate layer 702. In some aspects, the substrate layer 702 is a waveguide, such as display waveguide 306 of FIG. 3A. In some examples, the SiN layer 704 has a refractive index of around 2.02. Next, FIG. 7B illustrates the etching of the SiN layer 704 to form disparity waveguides 706A, 706B, and 706C. In FIG. 7C, a cladding layer 708 is deposited on the disparity waveguides 706A, 706B, and 706C. In some examples, cladding layer 708 includes SiO2 and has a refractive index of around 1.47. FIG. 7D illustrates the etching of input and/or output gratings 710A-710C for the in coupling and out coupling for each of the disparity waveguides.

Figure 8:
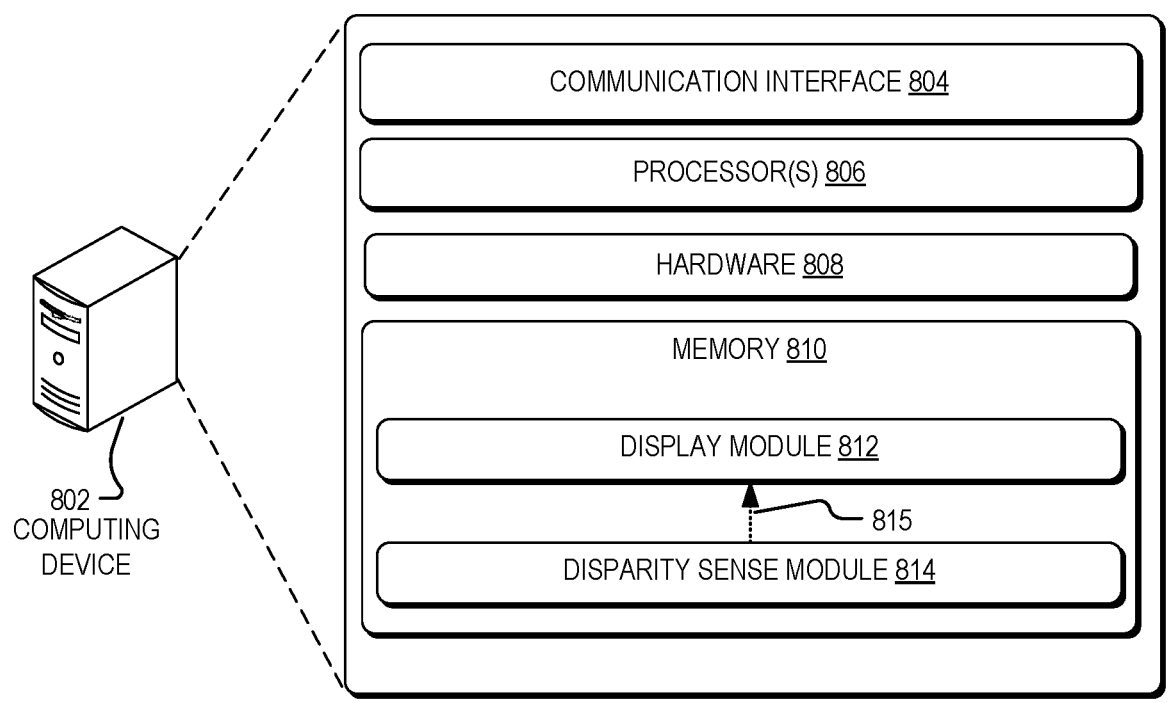
FIG. 8 illustrates an example computing device for the active disparity sensing of an HMD, in accordance with aspects of the disclosure.

FIG. 8 illustrates an example computing device 802 for active disparity sensing of an HMD, in accordance with aspects of the disclosure. The illustrated example of computing device 802 is shown as including a communication interface 804, one or more processors 806, hardware 808, and a memory 810. In one example, one or more of the components illustrated in FIG. 8 may be incorporated into the frame 202 and/or temple arms 204A/204B of the head-mounted device 200 of FIG. 2. In other examples, one or more of the components illustrated in FIG. 8 may be incorporated into a remote computing device that is communicatively coupled to the head-mounted device 200 for performing one or more aspects of active disparity sensing.

The communication interface 804 may include wireless and/or wired communication components that enable the computing device 802 to transmit data to and receive data from other networked devices. The hardware 808 may include additional hardware interface, data communication, or data storage hardware. For example, the hardware interfaces may include a data output device (e.g., electronic display, audio speakers), and one or more data input devices.

The memory 810 may be implemented using computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 806 and the memory 810 of the computing device 802 may implement a display module 812 and a disparity sense module 814. The display module 812 and the disparity sense module 814 may include routines, program instructions, objects, and/or data structures that perform particular tasks or implement particular abstract data types.

The memory 810 may also include a data store (not shown) that is used by the display module 812 and/or disparity sense module 814.

The display module 812 may be configured to control the generation and presentation of one or more virtual graphics (e.g., text, picture, video, or other visual information) on one or more of the optical assemblies of the HMD. For example, display module 812 may control projector 302 to generate display light 224 of FIG. 3A. The disparity sense module 814 may be configured to detect disparity between optical assemblies of the HMD in response to one or more measurements performed by the disparity sense circuit (e.g., disparity sense circuit 203 of FIG. 2). In some examples, the disparity sense module 814 performs the disparity sensing as part of a startup procedure (e.g., upon powering on) of the HMD. In other examples, the disparity sense module 814 may perform the disparity sensing in response to input received from the user, such as by way of a software calibration feature. In yet another example, the disparity sense module 814 may perform the disparity sensing at periodic intervals while the HMD is in use.

In some examples, the disparity sense module 814 is configured to generate a disparity signal 815 in response to detecting a disparity in the HMD. The disparity signal 815 may indicate that there is a disparity as well as an amount of the disparity. As shown in FIG. 8, the display module 812 may receive the disparity signal 815 where the display module 812 is further configured to adjust the rendering of one or more virtual graphics in response thereto. For example, the display module 812 may be configured to determine an offset to move or adjust the rendering location of a virtual graphic on one or both of electronic displays based on the disparity signal 815. In some examples, adjusting the rendering location of the virtual graphic adjusts where the virtual graphics are presented on the electronic display with respect to the optical elements of the HMD. Even still, adjusting the rendering of the virtual graphic may include aligning the rendering location of a virtual graphic displayed on a left-eye optical assembly with a virtual graphic displayed on a right-eye optical assembly.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A near-eye optical assembly, comprising
a display waveguide configured to receive, from a first input coupler disposed on a first side of the display waveguide, display light and to direct the display light to an eye of a user via a first optical path within the display waveguide; and
an optical structure that includes:
a second input coupler disposed on a second side of the display waveguide and configured to receive a portion of the display light that propagates from the first input coupler to the second input coupler through the display waveguide;
an output coupler disposed to receive the portion of the display light from the second input coupler and to provide the portion of the display light to a disparity sense circuit; and
a second optical path separate from the first optical path and disposed between the second input coupler and the output coupler to direct the portion of the display light from the second input coupler to the output coupler.

2. The near-eye optical assembly of claim 1, wherein the second optical path comprises a disparity waveguide disposed on a surface of the display waveguide.

3. The near-eye optical assembly of claim 1, wherein the second input coupler includes one or more reflectors to direct the portion of the display light along a surface of the display waveguide.

4. The near-eye optical assembly of claim 1, wherein the first input coupler includes an input grating to in couple the display light to the display waveguide, and wherein the input grating is disposed on the first side of the display waveguide that is opposite the second input coupler of the optical structure.

5. The near-eye optical assembly of claim 4, wherein the input grating and second the input coupler are disposed in a lateral region of the near-eye optical assembly, and wherein the second optical path is configured to direct the portion of the display light from the lateral region to a medial region of the near-eye optical assembly.

6. The near-eye optical assembly of claim 1, wherein the second input coupler comprises at least one image forming optic.

7. The near-eye optical assembly of claim 1, wherein the second input coupler comprises an angular-sensitive input grating.

8. The near-eye optical assembly of claim 1, wherein the optical structure includes a plurality of photonic integrated circuits (PICs) included in the near-eye optical assembly and coupled to provide a respective portion of the display light to the disparity sense circuit.

9. The near-eye optical assembly of claim 1, wherein the second optical path comprises a disparity waveguide embedded within the display waveguide.

10. A head mounted display (HMD), comprising:
a projector configured to generate display light; and
a near-eye optical assembly that includes:
- a display waveguide configured to receive, from a first input coupler disposed on a first side of the display waveguide, the display light and to direct the display light to an eye of a user via a first optical path within the display waveguide; and
- a photonic integrated circuit (PIC) coupled to the display waveguide, wherein the PIC includes:
  - a second input coupler disposed on a surface of the display waveguide at a second side of the display waveguide and configured to receive a portion of the display light that propagates from the first input coupler to the second input coupler through the display waveguide;
  - a second optical path separate from the first optical path and configured to direct the portion of the display light along the surface of the display waveguide; and
  - an output coupler disposed to receive the portion of the display light from the second optical path and coupled to provide the portion of the display light to a disparity sense circuit.

11. The HMD of claim 10, wherein the second optical path comprises a disparity waveguide disposed on the surface of the display waveguide.

12. The HMD of claim 10, wherein the projector includes:
a first region of pixels configured to generate display light within a field of view of the near-eye optical assembly; and
a second region of one or more pixels configured to generate display light that is outside the field of view, wherein the portion of the display light received by the second input coupler comprises display light generated by the second region of one or more pixels.

13. A head mounted display (HMD), comprising:
a frame;
a disparity sense circuit disposed in a bridge area of the frame; and
a left-eye optical assembly and a right-eye optical assembly secured within the frame, wherein at least one of the left-eye optical assembly or the right-eye optical assembly includes:
- a display waveguide configured to receive, from a first input coupler disposed on a first side of the display waveguide, display light from a respective projector and to direct the display light to an eye of a user via a first optical path within the display waveguide; and
- an optical structure that includes:
  - a second input coupler disposed on a second side of the display waveguide and configured to receive a portion of the display light that propagates from the first input coupler to the second input coupler through the display waveguide;
  - an output coupler disposed to receive the portion of the display light from the second input coupler and to provide the portion of the display light to the disparity sense circuit; and
  - a second optical path separate from the first optical path and disposed between the second input coupler and the output coupler to direct the portion of the display light from the second input coupler to the output coupler, wherein the disparity sense circuit is configured to detect disparity between the left-eye optical assembly and the right-eye optical assembly based on the portion of the display light.

14. The HMD of claim 13, wherein the second optical path comprises a disparity waveguide disposed on a surface of the display waveguide.

15. The HMD of claim 13, wherein the second input coupler includes one or more reflectors to direct the portion of the display light along a surface of the display waveguide.

16. The HMD of claim 13, wherein the first input coupler includes an input grating to in couple the display light to the display waveguide, and wherein the input grating is disposed on the first side of the display waveguide that is opposite the second input coupler of the optical structure.

17. The HMD of claim 16, further comprising at least one temple arm coupled to the frame, wherein the input grating and the second input coupler are disposed in a first region that is proximate to the at least one temple arm, and wherein the second optical path is configured to direct the portion of the display light from the first region to a second region that is proximate to the bridge area of the frame.

18. The HMD of claim 13, wherein the second input coupler comprises at least one image forming optic.

19. The HMD of claim 13, wherein the second input coupler comprises an angular-sensitive input grating.

20. The HMD of claim 13, wherein the optical structure includes one or more photonic integrated circuits (PICs) included in at least one of the left-eye optical assembly or the right-eye optical assembly, and wherein each PIC of the one or more PICs is coupled to provide a respective portion of the display light to the disparity sense circuit.

* * * * *